United States Patent [19]

Molnar

[11] Patent Number: 5,528,756
[45] Date of Patent: Jun. 18, 1996

[54] METHOD AND APPARATUS FOR PERFORMING SUPERVISORY FUNCTIONS IN DIGITAL SYSTEMS AND OBTAINING DIAGNOSTICS THEREOF

[75] Inventor: Richard J. Molnar, Willoughby, Ohio

[73] Assignee: Elsag International N.V., Amsterdam, Netherlands

[21] Appl. No.: 380,497

[22] Filed: Jan. 30, 1995

[51] Int. Cl.[6] .................................................. G06F 11/34
[52] U.S. Cl. .............................. 395/185.08; 364/267.9; 364/DIG. 1
[58] Field of Search .......................... 371/66, 15.1, 16.1, 371/16.3; 395/575, 185.01, 185.08, 550; 364/267, 267.9

[56] References Cited

U.S. PATENT DOCUMENTS

| | | | |
|---|---|---|---|
| 4,763,296 | 8/1988 | Gercekci | 372/16.3 |
| 4,860,289 | 8/1989 | Coulson | 371/12 |
| 5,073,853 | 12/1991 | Johnson | 395/575 |
| 5,081,625 | 1/1992 | Rhee et al. | 371/16.1 |
| 5,113,504 | 5/1992 | Matsuda | 395/185.08 |
| 5,155,846 | 10/1992 | Mino | 395/575 |
| 5,203,000 | 4/1993 | Folkes et al. | 371/66 |
| 5,274,827 | 12/1993 | Haggerty et al. | 371/66 |
| 5,285,452 | 2/1994 | Wee et al. | 371/66 |
| 5,315,161 | 5/1994 | Robinson et al. | 371/66 |
| 5,317,752 | 5/1994 | Jewett et al. | 364/200 |
| 5,327,362 | 7/1994 | Nomura | 395/185.08 |
| 5,341,497 | 8/1994 | Younger | 395/575 |
| 5,345,583 | 9/1994 | Davis | 395/185.08 |
| 5,404,356 | 4/1995 | Abe | 371/16.3 |
| 5,408,643 | 4/1995 | Katayose | 371/16.3 |
| 5,408,645 | 4/1995 | Ikeda et al. | 371/16.1 |
| 5,426,776 | 6/1995 | Erdman | 364/200 |
| 5,430,883 | 7/1995 | Horiuchi | 371/66 |

*Primary Examiner*—Robert W. Beausoliel, Jr.
*Assistant Examiner*—Albert Decady
*Attorney, Agent, or Firm*—Michael M. Rickin

[57] ABSTRACT

Digital supervisory and diagnostic circuitry to provide a watchdog function and a low voltage detect function and diagnostics for those functions. The watchdog function has a high immunity to EMI and RFI disturbances and may be enabled or disabled as necessary. An indication is provided of the cause of the last reset so that a reset due to EMI can be distinguished from a reset due to a power failure. The low voltage detect circuitry is implementable in an integrated circuit chip. The low voltage detect circuitry eliminates oscillations from the reset signal and provides a delay which is programmable by the user. The circuitry is designed so that the length of the delay can never be zero.

36 Claims, 3 Drawing Sheets

METHOD AND APPARATUS FOR PERFORMING SUPERVISORY FUNCTIONS IN DIGITAL SYSTEMS AND OBTAINING DIAGNOSTICS THEREOF

FIELD OF THE INVENTION

This invention relates to digital system supervisory and diagnostic circuitry and more particularly to a method and apparatus that performs supervisory functions such as a watchdog and low voltage detects and obtains diagnostic thereof for use with micro-processor-based industrial control equipment.

DESCRIPTION OF THE PRIOR ART

Supervisory functions such as watchdog circuits and low voltage detect circuits have been available for many years and are well known in the electronic development field. Existing methods for watchdog circuits include using a capacitively coupled signal from an address decoder in order to reset an analog or digital watchdog timer. One drawback of such a method is that the micro-processor may lose its place in the program sequence and inadvertently output an address in the watchdog address field. Should that occur the watchdog timer will reset as if everything is all right.

Electro-Magnetic Interference (EMI) or Radio Frequency Interference (RFI) are the most common causes for a microprocessor based system's program sequence to fail. Terms such as "the micro-processor got lost" are often used to refer to the effects of the above types of interference. For ease of description these interferences will be referred to hereinafter as EMI.

EMI can be conducted through wiring or radiated through the air. The effects of EMI can cause the address bus or data bus to change states in one or more printed circuit board trace lines. Usually that one change is all that it takes to get the micro-processor to start operating from the wrong memory locations or on incorrect data. A capacitively coupled or single address type watchdog is typically not sufficient due to the fact that it is quite possible for the micro-processor, after an EMI upset, to inadvertently output an address within the watchdog address field. The watchdog may not activate a reset if EMI causes the code to be stuck in a loop which happens to have the watchdog activation write command or if EMI causes a jump to execute code out of a data structure that happens to contain a combination of data which appears as being within the watchdog address field.

Improved watchdog methods have used two address or data sets to activate sequentially in order to prevent just one accidental instance of the micro-processor from triggering the watchdog circuit. This is a vast improvement over the single address approach. However, these watchdogs are typically designed to activate one address or data than the other over a fixed period of time in order to clear the watchdog timer.

Depicted in FIGS. 1a and b are block diagrams of two typical approaches used in the prior art for watchdog function circuitry. The prior art circuit 60 of FIG. 1a has an address decoder 62 which receives an address 67 from the microprocessor 61. If the address 67 is within the decoded range, the decoder 62 will output a variation in signal 68, which is directly connected to the watchdog timer 65. Such a signal may be a normally high signal that pulses low for a short period of time. This variation in output signal can also be coupled to the watchdog timer 65 through capacitor 63 rather than directly connected as is signal 68. Capacitor 63 only passes a signal from decoder 62 to watchdog timer 65 that changes states. Regardless of how the signal gets to the watchdog timer 65, the watchdog timer 65 is cleared by the level or the edge direction of the signal. The timer 64 within the watchdog may be set with an analog circuit such as a resistor-capacitor (RC) network or digitally with a counter. If the watchdog timer 65 is not cleared within the time period set by the RC network or counter in timer 64 then a reset signal 69 is generated for a system reset 66.

The prior art watchdog circuit 70 of FIG. 1b is an improvement over the circuit 60. Circuit 70 is often incorporated within micro-processor chips. An address 79 from the micro-processor 71 is decoded by address decoder 72. An address field is assigned to the watchdog function; however, only certain data 80 is recognized by the data decoder 73. The logic 74 determines whether the combination of decoded address and data is valid to clear the watchdog timer 76. The time period and enable/disable watchdog is typically set by data 78 from the micro-processor 71 once within so many cycles after a reset condition.

The limitation in time from a reset is required because this type of watchdog circuit 70 is very susceptible to a lost micro-processor writing to enable or disable the watchdog function. The reason for the susceptibility is that it would take only one write to the address field to enable or disable the watchdog function. Although this possibility of EMI disabling the watchdog function still exists during the first number of cycles in circuit 70, the limitation on the number of accessible cycles reduces the probability of an inadvertent watchdog disable. Unfortunately, this type of watchdog circuit 70 requires the software to handle the enable/disable feature during a predetermined number of initial cycles from reset. This requirement could become a potential problem if the system software is burdened with several functions requiring nearly immediate attention from start-up.

The advancement of electronic products has increased the reliability and interrelationship of software related functions and algorithms. Systems used in industrial control applications require watchdog type functions for the micro-processor based products. The dependency on software in these products has increased substantially as well; hence, having a watchdog clear timer operation every so many lines of code is not necessarily good enough, nor desirable, in some cases. Applying a watchdog function to a consecutive series of larger tasks is more likely to be a better approach. If the micro-processor does get lost and starts running some loop that happens to have the prior art watchdog activation sequence within the loop, then the watchdog may not trigger a reset. What is needed is an approach that can be customized to fit the current software development requirements and is flexible enough to adapt to the section of code that is running at the time.

Often the prior art methods require the watchdog to be enabled or disabled within the first so many cycles after a reset with the hope that EMI will not reprogram the enable/disable state during this time. Not only is this approach susceptible during this time, but it does not provide the flexibility to change the watchdog state during normal operation. Hence, once the watchdog is set with prior art methods it does not have the flexibility to work with a variety of individual software routine requirements.

Another problem with the prior art watchdog functions is the inability to distinguish an EMI reset from a power failure reset. This type of diagnostic would be very helpful in several applications. For example, in industrial control installations, EMI or problems with the electrical power, such as spikes or dips, can create reset problems. However, the solution to correcting the installation depends on which type of reset problem is exhibited, whether it is a result of EMI or electrical power problems. Often, industrial installations are only monitored once in a while, unless of course there is an obvious problem. Therefore, intermittent reset failures may go undetected for very long periods of time. Furthermore, different software functions may be warranted given either an EMI reset or a power failure reset.

There are very simple circuits in the prior art for monitoring the voltage level of the power supply. One such circuit 190 is shown in FIG. 2. A reference voltage (V_REF) 191 can be set by a zener diode or other means and input to one input of a comparator 193. The voltage supply line signal (VCC) 192 goes into the other input of the comparator 193. Commonly a resistor divider (not shown) is set between the voltage supply line and ground to create a center tapped voltage that is used as the voltage supply line signal 192 that is to be compared to a voltage reference signal 191. Occasionally a positive feedback resistor R1 of high resistance is placed across the comparator 193 in order to provide hysteresis. In this case, it may be necessary to swap the polarity of the connections of the signals 191 and 192 at the inputs to the comparator 193.

The hysteresis is used to eliminate multiple oscillations on the low voltage detect (LVD) output signal 194 which can occur from noise on the incoming voltage supply signal 192. Multiple oscillations can cause havoc on a system when the LVD signal 194 is used as the system reset. Depending on the system reset configuration, the signal from comparator 193 may or may not need to be inverted with a simple logic inverter. The high resistance feedback resistor which provides the hysteresis for immunity from multiple oscillations is not suited for implementation in integrated circuit chip implementations and requires extensive silicon area.

FIG. 2 also shows the waveforms for the VCC, V_REF and LVD signals. The threshold 196 for the reference voltage 191 is displayed as a dashed line. The voltage supply signal 197 rises in amplitude as power is applied. The LVD signal 195 does not go high until the voltage supply signal 197 surpasses the reference voltage threshold 196. In a similar manner, the LVD signal 195 goes low as soon as the voltage supply signal 197 falls below the reference voltage threshold 196.

In contrast to the prior art, the present invention provides a technique that eliminates oscillations from the reset signal while using a simple comparator without the hysteresis feedback resistor. This technique is ideally suited for integrated circuit chip applications. The present invention eliminates oscillations by providing a delay whose length is programmable by the user and is designed so that the length of the delay can never be zero.

In addition, the present invention provides the ability to detect between EMI resets and power failures resets. Furthermore, the present invention allows flexible watchdog features that permit a variety of watchdog activations in order to safely customize to various software tasks which are being run in the system.

SUMMARY OF THE INVENTION

A method for performing a watchdog function in a digital system which has a control cycle. In the method first and second signals are generated for at least a predetermined number of times every control cycle. In every control cycle a predetermined pattern of occurrence of the first and second signals is counted until a predetermined count is reached. The method determines by no later than the end of each control cycle if the predetermined count has or has not been obtained. The digital system is reset if it has been determined that the predetermined count was not obtained by no later than the end of a control cycle.

A method for performing diagnostics in a digital system that has a control cycle. In the method a watchdog function is enabled during one of the control cycles. The enabled watchdog function is then performed in the manner described above in each of the control cycles that are subsequent to the control cycle in which the watchdog function is enabled.

A method for performing diagnostics in a digital system that has a control cycle. In the method the enabled watchdog function is then performed in the manner described above in each of the control cycles.

A method for performing a low voltage detect function in a digital system that has a control cycle. In the method the voltage of a power supply in the system is monitored. A signal which indicates low power supply voltage is generated when the monitored voltage is below a reference voltage. In response to the signal indicative of low power supply voltage the digital system is reset and the control cycles are stopped. The power supply voltage is monitored and a signal indicative of adequate power supply voltage is generated when the low power supply voltage rises above the reference voltage. The method then starts the first control cycle a predetermined time after the generation of the signal that indicates an adequate power supply voltage. The method selects in a control cycle a time duration for those control cycles that occur subsequent to the control cycle in which the time duration is selected.

DESCRIPTION OF THE PREFERRED EMBODIMENT (s)

Figure 3:
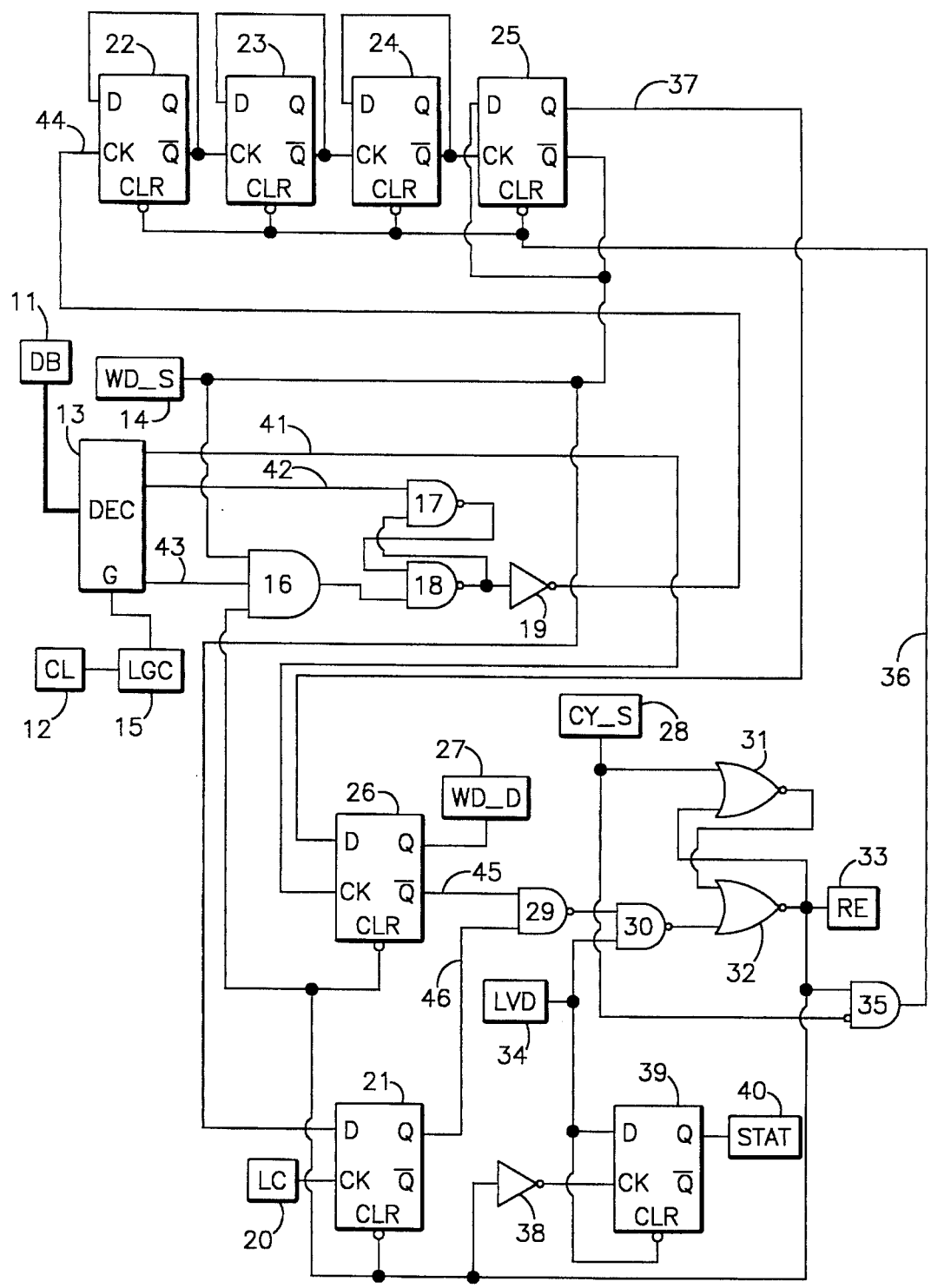
FIG. 3 the diagnostic circuitry of the invention.

Depicted in FIG. 3 is one embodiment for the watchdog circuit 10 of the present invention. A data bus 11 from a micro-processor based system (not shown) is input to a decoder 13. Control lines 12 from the micro-processor based system are input to logic 15. These control lines 12 can be, but not limited to, read/write and chip select signals from the micro-processor based system. The logic 15 enables the decoder 13. An AND gate 16 receives inputs in the form of the watchdog state signal 14, the decoder watchdog down signal 43 and the reset external signal 33. The NAND gate 17 has inputs from another NAND gate 18 and the decoder watchdog up signal 42. The NAND gate 18 has inputs from the other NAND gate 17 and AND gate 16.

Inverter 19 inverts the signal from NAND gate 18 to provide a signal 44 which is used to clock data flip-flop 22. The D flip-flops 22, 23, 24, and 25 each have their inverted output "Q NOT" tied to their data input "D". The Q NOT signal of each flip-flop is also tied to the clock input of the next flip-flop, that is Q NOT of 22 is tied to the D input of 23, etc. The flip-flop clear (CLR) terminals for the flip-flops 22–25 are tied to receive signal 36 from AND gate 35. The watchdog state signal 14 is determined from the inverted output of flip-flop 25.

Figure 1A:
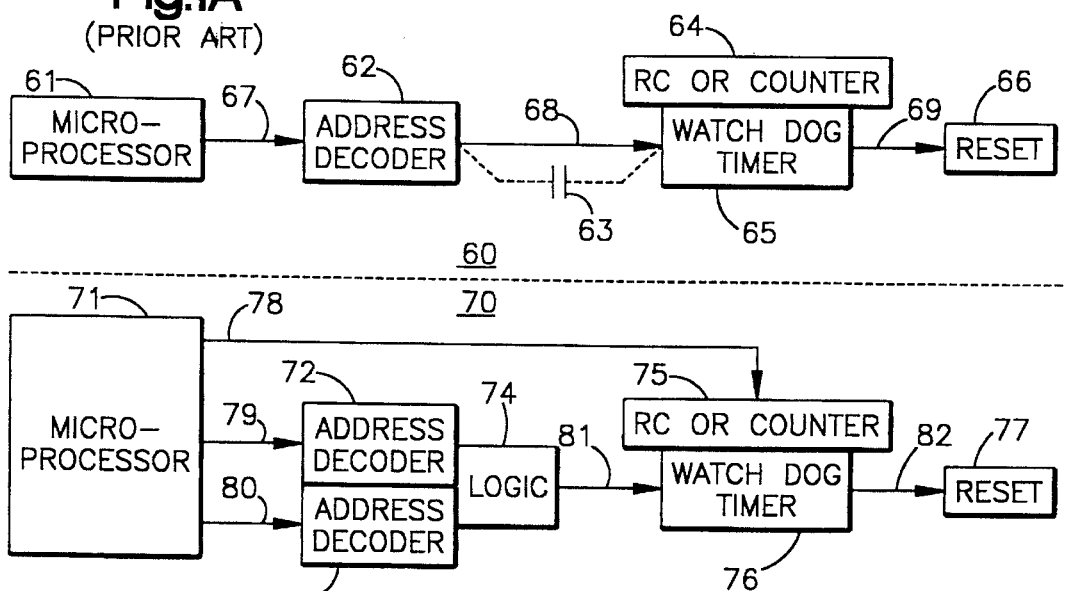
FIGS. 1a and 1b are block diagrams of two prior art implementation for a watchdog function.
Figure 1B:
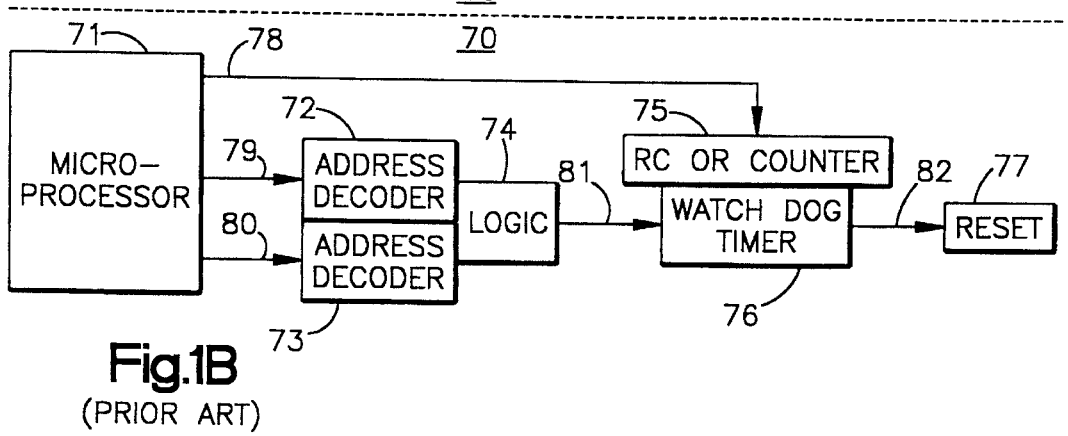
Figure 2:
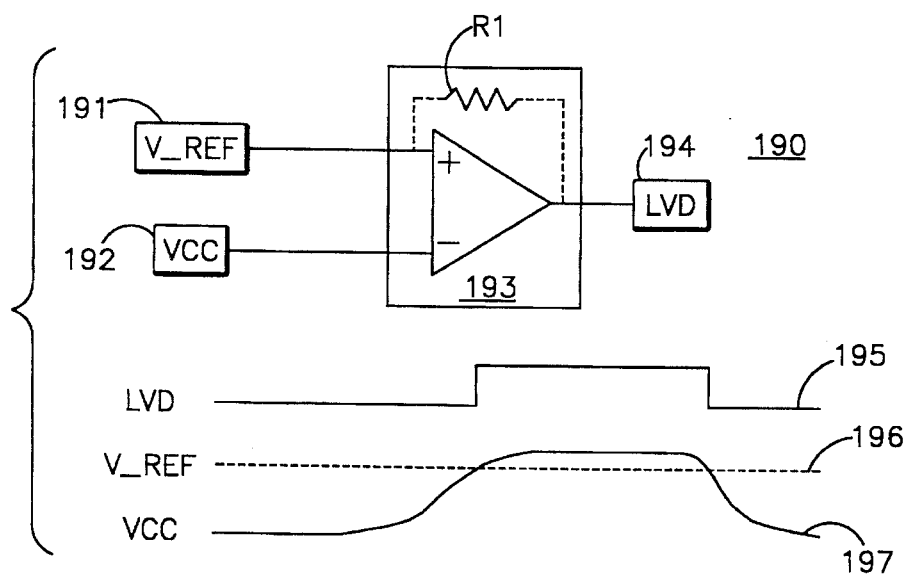
FIG. 2 shows an implementation of a low voltage detect circuit from the prior art and waveforms associated therewith.
Figure 5:
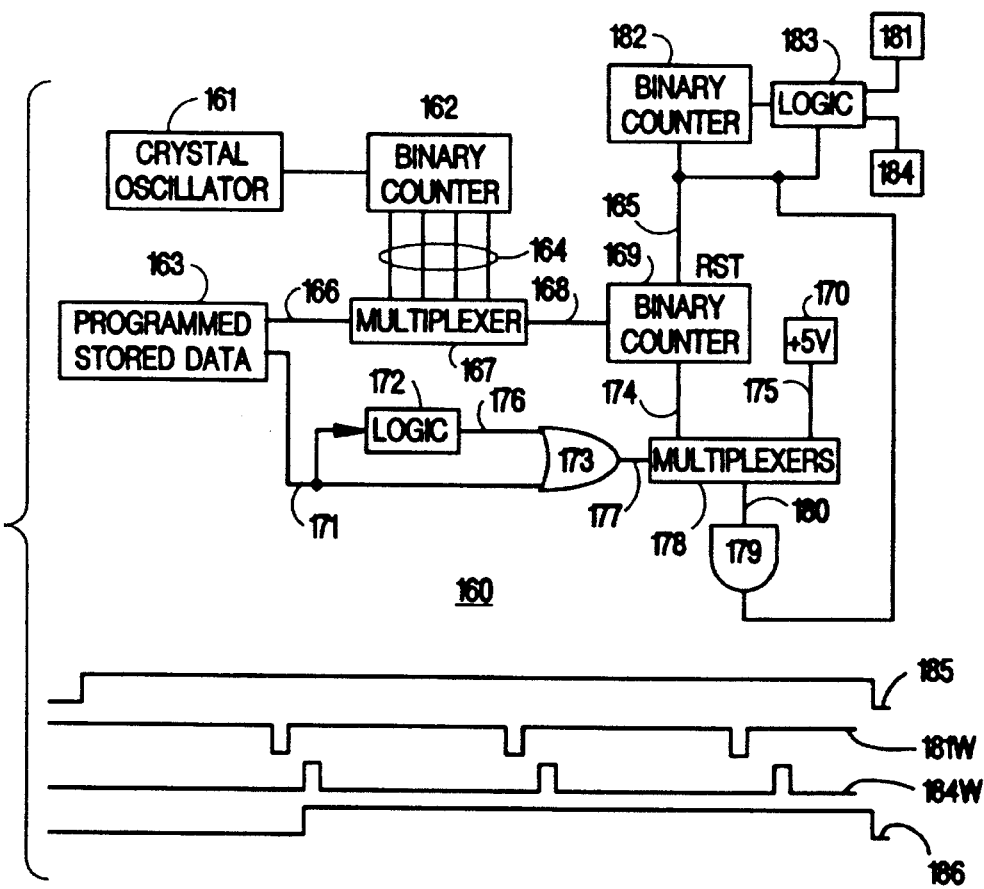
FIG. 5 shows the digital clock timing signal generation circuitry for the diagnostic circuitry.

The watchdog state signal 14 also feeds the data input of flip-flop 21. Flip-flop 21 is clocked from a latch watchdog state signal 20. The signal 20 is generated from a clock 0 generation circuit 160 shown in FIG. 5, and more specifically from signal 181 which has the waveform 181W as shown in FIG. 5. The output "Q" 37 of flip-flop 25 goes to the data input "D" of flip-flop 26. Watchdog enable/disable signal 41, also from decoder 13, is used to clock flip-flop 26. Flip-flops 26 and 21 are cleared by the reset external signal 33. The output "Q" of flip-flop 26 is the watchdog disabled status signal 27. The NAND gate 29 receives one input from the inverted output 45 of flip-flop 26 and the other input from the output signal 46 of flip-flop 21. A low voltage detect (LVD) signal 34 comes from a comparator circuit 190 (see FIG. 2). The signal 34 is shown in FIG. 2 as signal 194 having a waveform 195. This LVD signal 34 is one input to a NAND gate 30 whose other input is from NAND gate 29.

A cycle start pulse signal 28 comes from circuit 160 of FIG. 5. The signal 28 is shown in FIG. 5 as signal 184 having a waveform 184W. This cycle start pulse signal 28 can be used to indicate the start of a control cycle in an industrial control product and is one input to a NOR gate 31 whose other input comes from NOR gate 32. NOR gate 32 has one input from NOR gate 31 as well as its other input from NAND gate 30. The output of NOR gate 32 produces the reset external signal 33. This reset external signal 33 feeds one input to an AND gate 35 which also has an input from the cycle start pulse signal 28 which is inverted at the AND gate 35 input. Inverter 38 inverts the reset external signal 33 to provide an output that is used to clock flip-flop 39. Data for flip-flop 39 comes from the LVD signal 34 which also is used to clear the flip-flop 39.

The output "Q" of flip-flop 39 is the reset status 40. The reset status signal 40 provides an indication of the cause of the last reset. If the reset status signal is a zero the last reset resulted from a low voltage detect whereas if the reset status signal is a one the last reset was caused by the watchdog. Therefore, the monitoring of the reset status signal provides the ability to discriminate between the cause of the reset.

A person skilled in the art can appreciate that certain predictable events can clearly be associated with causing these distinguishable resets. For example, a dip in system power supply voltage would most likely cause a low voltage detect reset; whereas, a strong EMI spike would most likely cause a watchdog reset. The user of the system in which the present invention is included could take advantage of this information by customizing the system reset program to expedite the system initialization given the knowledge of the type of reset which has just occurred.

Figure 4:
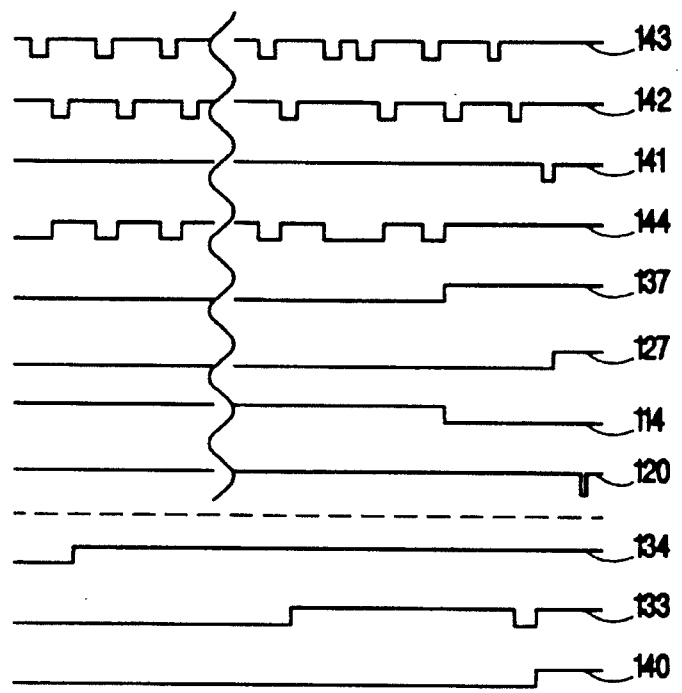
FIG. 4 is a diagram which shows the waveforms of the signals associated with the diagnostic functions.

FIG. 4 shows the timing relationship between various signals in circuit 10. Timing waveform 143 relates to watchdog down signal 43. Timing waveform 142 relates to watchdog up signal 42. Timing waveform 141 relates to watchdog enable/disable signal 41. Timing waveform 144 which is indicative of signal 44 shows the operation due to the watchdog up 142 and down 143 signals. It should be noted that there is a break, portrayed as a vertical squiggly line, in the waveforms shown above the dashed line in FIG. 4. The break is necessary for the presentation of the waveforms in the figure because waveform 144 has to have eight rising edges before waveform 137, which correlates to signal 37, will go high. As can be seen in FIG. 4, the watchdog up signal causes a rising edge on the signal 44 and the watchdog down signal causes a trailing edge on the signal 44. Therefore, in order for signal 44 to have the eight rising edges there must be at least fifteen alternating operations of the watchdog up and down signals.

It should also be noted that waveform 114, which correlates to watchdog state signal 14, is the inverse of waveform 137. The signal 14 can be monitored by the micro-processor to verify clearing the watchdog state. Several states of the watchdog can be monitored by the micro-processor simply by routing the desired signals such as WD_S 14, WD_D 27, and STAT 40, to the input of a data latch (not shown) which the micro-processor can access. The methods for latching, clocking, and accessing this data from the data latch to the micro-processor will not be described since these methods are well known to any one skilled in the art.

Additional watchdog up and down operations are acceptable both in alternating and consecutive forms as can be seen in waveforms 143, 142, and 144 as long as the minimum number of alternating operations described above is met. Software routines can therefore be designed to operate just one of the watchdog operations such as a single watchdog up operation in a specifically called subroutine function. A task can run this subroutine function from once to a number of times possibly based on some passed parameter to the subroutine, which is not possible with some prior art approaches. A good software design would apply some sort of a reasonable sequence of alternating watchdog operations.

One such design may have the operating system only perform a watchdog down operation after a specific task returns successfully along with a guaranteed operating system task queue of at least 15 alternating watchdog operations per control cycle. As long as waveform 137 is high by the time the negative going pulse of waveform 120, which correlates to latch watchdog state signal 20, goes high, the watchdog circuit 10 will not cause the reset external 33 to go low. Reset external 33 is the signal that would normally be connected to the system reset line.

If the software wants to disable the watchdog function then it must first perform the 15 alternating watchdog operations shown in waveforms 143 and 142. Afterward the software must perform an enable/disable watchdog operation which produces the pulse shown in 141. This pulse latches the state of waveform 137 and produces waveform 127. Monitoring the state of signal 27 allows the microprocessor to verify whether the watchdog function is enabled or disabled. Once signal 27 is high, signal 45 is low, which disables the watchdog action through NAND gate 29. However, the low voltage detect circuitry is still active through NAND gate 30. This allows an application to utilize the LVD 34 portion of the embodiment without requiring the watchdog portion.

Enabling the watchdog is very easy simply by performing a watchdog enable/disable operation, that is producing the pulse shown in 141, prior to a 15 alternating watchdog operation sequence. As is shown in FIG. 4, enabling the watchdog does not require that the 15 operation sequence first be performed before the watchdog is enabled. Therefore, it is much easier to enable the watchdog of the present invention than to disable it which is a desirable feature.

For example, a lost micro-processor inadvertently writes to disable the watchdog after the alternating 15 operation sequence has occurred. There is a high probability that the lost micro-processor would write the disable command again sometime afterward especially if it is stuck in a loop. The writing of the disable command produces the pulse shown in 141. However, the next time the micro-processor writes the disable command it is almost certain that the alternating 15 operation sequence would not have taken place and the watchdog would get enabled again. Shortly afterward the reenabled watchdog will, as a result of its reenabling, cause a system reset, even though initially EMI may have caused the watchdog to disable.

A disadvantage of the prior art is the inability to enable/disable the watchdog while running. It might be thought that it is ludicrous to allow an operation to disable the Watchdog in normal operation because a lost micro-processor could inadvertently rewrite the enable/disable watchdog register. That thought would be correct if the methods of the prior art were used. This is why the prior art methods limit the write time to only a few cycles after start-up to reduce the possibility of an inadvertent enable/disable watchdog write.

In contrast, the invention drastically reduces the possibility that an inadvertent enable/disable watchdog write will disable the watchdog by requiring the 15 alternating sequence followed by a watchdog enable/disable operation before the control cycle elapses. In fact, a series of EMI pulses over a short period of time caused possibly by a nearby motor failure could potentially rewrite the prior art enable/disable watchdog register. However, the invention is practically immune to this type of EMI disturbance.

For example, the initial EMI disturbance could trigger a watchdog reset. Another EMI disturbance during those first cycles of the operation after the reset could potentially rewrite the prior art watchdog enable/disable register. Several consecutive EMI disturbances increase the probability of inadvertently rewriting a watchdog disable in the prior art. Once the EMI disturbances have passed the prior art system may be running with the watchdog inadvertently disabled.

In order for an EMI disturbance to cause the present invention to rewrite the enable/disable register, the EMI would have to first allow 15 alternating consecutive watchdog operations within the control cycle period. This would be very difficult to achieve in the presence of consecutive EMI disturbances. Hence, a controlled watchdog enable/disable such as the one described herein would have advantages over the prior art not only in reduced susceptibility as described above, but also in providing the ability to offer a controlled enable/disable watchdog feature.

The capability of the present invention to allow disabling of the watchdog permits its use in products not requiring watchdog functionality. This saves software development time and programming memory, yet utilizes the benefits of economy of scale for the procurement of a versatile chip that can also be used in products that do require a watchdog function as well as in products that do not require that function. Furthermore, the ability to disable the watchdog feature in specific instances of the software provides an extra level of flexibility to the software development. Some software applications, for example, those that require continuous fast down loading, may not have time to be performing watchdog operations in between the down loading. Another example is the speeding up of off-line operations which do not require a watchdog environment.

Waveform 134 shows the low voltage detect (LVD) signal 34. The waveform 133 shows the reset external signal 33. It should be noted that there is a period of time between the rising edge of waveform 134 and the rising edge of waveform 133. This time period is set by the programmable clock generation circuit 160 shown in FIG. 5. The LVD signal 34 is shown as waveform 185 in FIG. 5. The reset external waveform 186 of FIG. 5, which is a portion of waveform 133 of FIG. 4, rises when cycle start pulse 184 and waveform 184W rise. The circuits 10, 160, and 190, with or without the feedback resistor R1 shown in FIG. 2, provide the time delay from power-up. The time when waveform 133 pulses low indicates that a watchdog reset has occurred.

As will be described in more detail below, the present invention allows for a delayed reset external signal to be provided on power up without the need for the hysteresis resistor R1 and therefore is ideally suited for integrated circuit chip applications. The delay allows the entire system to first settle out before the reset external signal is applied thereto to thereby provide noise immunity. In addition, the present invention allows the length of the delay to be programed by the user and is designed so that the length of the delay can never be zero.

It should be noted that waveform 140, of FIG. 4, which corresponds to signal 40 tracks the status of the reset. As was described above, if status signal 40 is low, then the last reset was due to a low voltage detect. If the signal 40 is high, the last reset must have occurred due to a watchdog fail. As mentioned previously, the state of signal 40 can be read by the micro-processor.

FIG. 5 displays the programmable clock generation and timing circuitry 160. The crystal oscillator 161 clocks binary counter 162. The LVD signal 34 is used to reset each of the binary counters 162, 169, and 182 to an initial zero state. The connection of the LVD signal to the counters is not shown in FIG. 5. Once the LVD signal 34 and LVD waveform 185 both go high, the binary counter 162 can start to count. Programmed stored data 163 is set with the micro-processor (not shown). The programmed stored data 163 bits are reset to zero with the LVD 34 signal during power-up.

Stored data bits 166 from data set 163 select which binary counter output line of 164 will pass through multiplexer 167. In FIG. 5, the heavy dark line indicates a connection that carries more than one bit. While the multiple lines for those connections are not shown in FIG. 5, those skilled in the art will be able to provide the same from the description set forth herein.

The multiplexer output 168 is used to clock binary counter 169. The other set of stored data bits 171 in programmed stored data 163 are used as input to the logic 172 and as inputs to the logic OR function 173 which is a number of OR gates arranged to provide, as described below, a predetermined output when the bits 171 are all zero. For ease of drawing only one such OR gate 173 is shown in FIG. 5.

The logic 172 is used to output high lines given certain inputs 171. For example, if 171 is all zeroes, the logic 172 puts out all ones. Otherwise logic 172 outputs all zeroes. These all ones or all zeroes from logic 172 are OR'd to each data bit 171 respectively at gates 173 to produce a predetermined binary number. In one embodiment for circuit 160, the logic 172 and OR functions 173 produce a 6 bit 101101, that is, a binary forty-five, when the stored data bits 171 are all zero. This type of functionality guarantees that the OR gates 173 will never have all zeroes at its output 77, even from power-up and therefore guarantees a predetermined delay as will be discussed below. The outputs 77 select the channels to multiplex in multiplexers 178.

The binary counter 169 has outputs 174 to multiplexers 78. A supply 170 supplies high level lines 175 to multiplexers 178. Multiplexer 178 passes, depending on the signals 177, certain of the specified binary counter output lines 174 and non-specified high level logic lines 175 through lines 180 to AND gate 179. In other words, if binary counter 169 has 6 bits to output over 174, and the signals 177 are for example, 001001, which can be thought of as a binary nine, then the least significant bit of 174 and third most significant bit of 174 will pass to AND gate 179. The other four bits passed to AND gate 179 will be provided by multiplexer 178 from the associated ones of the non-specified high level logic lines 175.

The output 165 of the AND gate 179 is used to reset the binary counter 169. Hence, the operation of the logic between outputs 168 and 165 functions as a programmable clock divider based on the programmed stored data 163. The binary counter 182 takes in this clock divided signal 165 and further reduces it in a binary form. The logic 183 has inputs from both 165 and binary counter 182 output signals to thereby produce clock signals 181 and 184. In FIG. 5, the waveform for the signal 181 is represented as 181W and the waveform for the cycle start signal 184 is represented as 184W. Details of the logic 183 need not be given since one skilled in the art can easily derive the same from the inputs as shown in circuit 160 and the description given herein to arrive at the waveforms 181W and 184W.

Standard crystal frequencies can be used to generate standard baud rates with clock dividers. Often the required ratio can first be made of dividers using factors of 2; however, additional factors, dependent on the crystal frequency, such as 5, and 9 are required as well. If for example, 5 and 9 are the only programmable additional factors of desire, the multiplexer 178, associated input logic 171, 172, 173, 177, 174, and 175, and AND gate 179 inputs 180 can all be reduced in complexity as described directly below.

In the case of 5, a binary 101, and 9, a binary 1001, the two least significant bits, 0 and 1 are common. Therefore, the least significant bit can be fed directly from the binary counter 169 to AND gate 179 without going through multiplexer 178. The second from least significant bit of binary counter 169 does not need to go any where. The programmed stored data 163 bits can be reduced since the two least significant bits do not need to be specified.

More programmed stored data bits 171 may be reduced by mapping smaller unused data patterns to represent desired data patterns for the multiplexer 178 channel select lines 177. For example, if only 5, 9, and 45, a binary 101101, will be used as dividing patterns, only two bits 171 would be necessary using the above example. The logic 172 and OR functions 173 could be designed to yield a 45 representation when bits 171 are 00, passing 1011 across 177; whereas five would have bits 171 of 01 which pass 0001 across 177, and nine would use the 171 bit pattern of 10 to pass 0010 across 177 to multiplexer 178. In the example of 5 and 9, described above, it was not necessary to have the last two bits for the multiplexer.

The use of a binary counter 162 to do the initial divide by a multiple of 2 helps reduce power. The programmable counter divider circuitry that surrounds counter 169 is run and reset from a much slower frequency on output 168 than if that circuitry were to exchange places with counter 162.

The logic 172 and OR gate 173 functions, along with the LVD signal 34 resetting the programmed stored data 163 and counters 162, 169, and 182, to provide the ability to delay the rise of the reset external waveform 186 a predetermined amount from the rise of the LVD waveform 185. This predetermined delay acts as a noise immunity feature in the output of the reset external signal 33. Even if the LVD signal oscillates continuously for a period of time, the reset external signal 33 and waveform 186 will not go high until the LVD has stopped oscillating and is in the high state for the predetermined amount of time. This predetermined amount of time will typically be on the order of several milliseconds which is well above a typical LVD oscillation period. As was described above, the predetermined amount of time is programmable and is determined by the count in the program stored data 163. As was also described above, if the bits in the programmed stored data 163 are all zero the predetermined amount of time is not zero and is fixed by the arrangement of the OR gates 173.

Another feature of this reset external signal 33 is that it will go low the instant that the LVD signal 34 indicates a low voltage supply. The reset external signal 33 will remain low, even if the LVD is oscillating. Once again the reset external signal 33 will not go high until the voltage supply was all right for at least the predetermined amount of time. This time delay is very desirable in systems during power-up because it gives the entire system a chance to settle and start operating from a reliable supply level.

It should be appreciated that while both a watchdog circuit 10 and a programmable clock generation and timing circuit 160 have both been described herein in conjunction with one another, circuit 10 may be used independent of circuit 160 and circuit 160 may be used independent of circuit 10.

It should further be appreciated that the time between occurrences of the cycle start pulse is the time duration of the control cycle of the system in which the present invention is used. Therefore, the time duration of the control cycle is determined either by the count in programmed stored data 163 or if the count is all zeroes then the predetermined time fixed by the arrangement of the OR gates 173.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for performing a watchdog function in a digital system having a control cycle, said method comprising the steps of:

a. generating a first signal for at least a predetermined number of times every control cycle;

b. generating a second signal for at least a predetermined number of times every control cycle;

c. counting in every control cycle a predetermined pattern of occurrence of said first and second control signals until a predetermined count is obtained;

d. determining by no later than the end of each control cycle if said predetermined count has or has not been obtained; and e. resetting said digital system if it is determined by no later than the end of a control cycle that said predetermined count has not been obtained.

2. The method of claim 1 further comprising the step of providing an indication when said digital system is reset that said resetting was caused by determining by no later than the end of a control cycle that said predetermined count had not been obtained in that control cycle.

3. The method of claim 1 further comprising the step of disabling said watchdog function in a control cycle only after said predetermined count has been obtained.

4. The method of claim 1 wherein said step of counting in every control cycle a predetermined pattern of occurrence of said first and second control signals comprises the step of counting in every control cycle the first occurrence of said first signal in said control cycle and each occurrence of said first signal thereafter that is preceded by an occurrence of said second signal and each occurrence of said second signal that immediately follows an occurrence of said first signal until said predetermined count is obtained.

5. A method for performing diagnostics in a digital system having a control cycle, said method comprising the steps of:
   a. enabling during one of said control cycles a watchdog function in said digital system; and
   b. performing said enabled watchdog function in each of said control cycles subsequent to said control cycle in which said watchdog function is enabled, said performance comprising in each of said subsequent control cycles the steps of:
      i. generating a first signal for at least a predetermined number of times;
      ii. generating a second signal for at least a predetermined number of times;
      iii. counting a predetermined pattern of occurrence of said first and second control signals until a predetermined count is obtained;
      iv. determining by no later than the end of each of said subsequent control cycles if said predetermined count has or has not been obtained; and
      v. resetting said digital system if it is determined by no later than the end of each of said subsequent control cycles that said predetermined count has not been obtained.

6. The method of claim 5 wherein said step of performing said enabled watchdog function further comprises the step of providing an indication when said digital system is reset that said resetting was caused by a determination no later than the end of each of said subsequent control cycles that said predetermined count had not been obtained in that control cycle.

7. The method of claim 5 further comprising the step of disabling said enabled watchdog function in any one of said subsequent control cycles only after said predetermined count has been obtained.

8. The method of claim 5 wherein said enabled watchdog function is also performed in said control cycle in which said watchdog function is enabled.

9. The method of claim 8 further comprising the step of disabling said enabled watchdog function in said control cycle in which said watchdog function is enabled only after said predetermined count has been obtained.

10. The method of claim 5 further comprising the step of performing a low voltage detect function in said system comprising the steps of:
    a. monitoring a voltage generated by a power supply in said system and generating a signal indicative of low power supply voltage when said power supply voltage is below a reference voltage;
    b. resetting said digital system in response to said signal indicative of low power supply voltage;
    c. stopping said control cycles in response to said signal indicative of said low power supply voltage;
    d. monitoring said power supply voltage and generating a signal indicative of adequate power supply voltage when said power supply voltage is above said reference voltage; and
    e. starting said control cycles a predetermined time after said signal indicative of adequate power supply voltage is generated.

11. The method of claim 10 further comprising the step of providing an indication when said digital system is reset that said resetting was in response to said signal indicative of low power supply voltage.

12. The method of claim 10 further comprising the step of selecting in a control cycle a time duration for said control cycles that occur subsequent to said control cycle in which said time duration is selected.

13. The method of claim 5 wherein said step of counting a predetermined pattern of occurrence of said first and second control signals comprises the step of counting in every control cycle the first occurrence of said first signal in said control cycle and each occurrence of said first signal thereafter that is preceded by an occurrence of said second signal and each occurrence of said second signal that immediately follows an occurrence of said first signal until said predetermined count is obtained.

14. A method for performing diagnostics in a digital system having a control cycle, said method comprising the steps of:
    a. performing a watchdog function in said system comprising the steps of:
       i. generating a first signal for at least a predetermined number of times every control cycle;
       ii. generating a second signal for at least a predetermined number of times every control cycle;
       iii. counting in every control cycle a predetermined pattern of occurrence of said first and second control signals until a predetermined count is obtained;
       iv. determining by no later than the end of each control cycle if said predetermined count has or has not been obtained; and
       v. resetting said digital system if it is determined by no later than the end of a control cycle that said predetermined count has not been obtained.

15. The method of claim 14 further comprising the step of providing an indication when said digital system is reset that said resetting was caused by determining by no later than the end of a control cycle that said predetermined count had not been obtained in that control cycle.

16. The method of claim 14 further comprising the step of disabling said watchdog function in a control cycle only after said predetermined count has been obtained.

17. The method of claim 14 further comprising the step of performing a low voltage detect function in said system comprising the steps of:
    a. monitoring a voltage generated by a power supply in said system and generating a signal indicative of low power supply voltage when said power supply voltage is below a reference voltage;
    b. resetting said digital system in response to said signal indicative of low power supply voltage;
    c. stopping said control cycles in response to said signal indicative of said low power supply voltage;
    d. monitoring said power supply voltage and generating a signal indicative of adequate power supply voltage when said power supply voltage is above said reference voltage; and
    e. starting said control cycles a predetermined time after said signal indicative of adequate power supply voltage is generated.

18. The method of claim 17 further comprising the step of providing an indication when said digital system is reset that said resetting was in response to said signal indicative of low power supply voltage.

19. The method of claim 17 further comprising the step of selecting in a control cycle a time duration for said control cycles that occur subsequent to said control cycle in which said time duration is selected.

20. The method of claim 14 wherein said step of counting in every control cycle a predetermined pattern of occurrence of said first and second control signals comprises the step of counting in every control cycle the first occurrence of said first signal in said control cycle and each occurrence of said first signal thereafter that is preceded by an occurrence of said second signal and each occurrence of said second signal that immediately follows an occurrence of said first signal until said predetermined count is obtained.

21. A method for performing a low voltage detect function in a digital system having a control cycle, said method comprising the steps of:
 a. monitoring a voltage generated by a power supply in said system and generating a signal indicative of low power supply voltage when said power supply voltage is below a reference voltage;
 b. resetting said digital system in response to said signal indicative of low power supply voltage;
 c. stopping said control cycles in response to said signal indicative of said low power supply voltage;
 d. monitoring said low power supply voltage and generating a signal indicative of adequate power supply voltage when said low power supply voltage rises above said reference voltage;
 e. starting a first of said control cycles a predetermined time after said signal indicative of adequate power supply voltage is generated; and
 f. selecting in a control cycle a time duration for said control cycles that occur subsequent to said control cycle in which said time duration is selected.

22. The method of claim 21 further comprising the step of providing an indication when said digital system is reset that said resetting was in response to said signal indicative of low power supply voltage.

23. In a digital system having a control cycle, a watchdog function comprising:
 a. means for generating a first signal for at least a predetermined number of times every control cycle;
 b. means for generating a second signal for at least a predetermined number of times every control cycle;
 c. means for counting in every control cycle a predetermined pattern of occurrence of said first and second control signals until a predetermined count is obtained;
 d. means for determining by no later than the end of each control cycle if said predetermined count has or has not been obtained; and
 e. means for resetting said digital system if it is determined by no later than the end of a control cycle that said predetermined count has not been obtained.

24. The watchdog function of claim 23 further comprising means for providing an indication when said digital system is reset that said resetting was caused by determining by no later than the end of a control cycle that said predetermined count had not been obtained in that control cycle.

25. The watchdog function of claim 23 further comprising means for disabling said watchdog function in a control cycle only after said predetermined count has been obtained.

26. A digital system having a control cycle comprising:
 a. means for enabling during one of said control cycles a watchdog function in said digital system, said enabled watchdog function performed in each of said control cycles subsequent to said control cycle in which said watchdog function is enabled, said watchdog function comprising:
  i. means for generating a first signal for at least a predetermined number of times in each of said subsequent control cycles;
  ii. means for generating a second signal for at least a predetermined number of times in each of said subsequent control cycles;
  iii. means for counting in each of said control cycles a predetermined pattern of occurrence of said first and second signals until a predetermined count is obtained;
  iv. means for determining by no later than the end of each of said subsequent control cycles if said predetermined count has or has not been obtained; and
  v. means for resetting said digital system if it is determined by no later than the end of each of said subsequent control cycles that said predetermined count has not been obtained.

27. The digital system of claim 26 wherein said watchdog function further comprises means for providing an indication when said digital system is reset that said resetting was caused by a determination no later than the end of each of said subsequent control cycles that said predetermined count had not been obtained in that control cycle.

28. The digital system of claim 26 further comprising means for disabling said enabled watchdog function in any one of said subsequent control cycles only after said predetermined count has been obtained.

29. The digital system of claim 26 wherein said enabled watchdog function is also performed in said control cycle in which said watchdog function is enabled.

30. The digital system of claim 29 further comprising means for disabling said enabled watchdog function in said control cycle in which said watchdog function is enabled only after said predetermined count has been obtained.

31. The digital system of claim 26 further comprising a low voltage detect function in said system comprising:
 a. means for monitoring a voltage generated by a power supply in said system and generating a signal indicative of low power supply voltage when said power supply voltage is below a reference voltage;
 b. means for resetting said digital system in response to said signal indicative of low power supply voltage;
 c. means for stopping said control cycles in response to said signal indicative of said low power supply voltage;
 d. means for monitoring said low power supply voltage and generating a signal indicative of adequate power supply voltage when said low power supply voltage rises above said reference voltage; and
 e. means for starting a first of said control cycles a predetermined time after said signal indicative of adequate power supply voltage is generated.

32. The digital system of claim 31 wherein said low voltage detect function further comprises means for providing an indication when said digital system is reset that said resetting was in response to said signal indicative of low power supply voltage.

33. The digital system of claim 31 wherein said low voltage detect function further comprises means for selecting in a control cycle a time duration for said control cycles that occur subsequent to said control cycle in which said time duration is selected.

34. The digital system of claim 26 wherein said means for counting in every control cycle a predetermined pattern of occurrence of said first and second control signals comprises means for counting in every control cycle the first occurrence of said first signal in said control cycle and each occurrence of said first signal thereafter that is preceded by an occurrence of said second signal and each occurrence of said second signal that immediately follows an occurrence of said first signal until said predetermined count is obtained.

35. A digital system having a control cycle, said digital system having a low voltage detect function therein, said low voltage detect function comprising:

- a. means for monitoring a voltage generated by a power supply in said system and generating a signal indicative of low power supply voltage when said power supply voltage is below a reference voltage;
- b. means for resetting said digital system in response to said signal indicative of low power supply voltage;
- c. means for stopping said control cycles in response to said signal indicative of said low power supply voltage;
- d. means for monitoring said low power supply voltage and generating a signal indicative of adequate power supply voltage when said how power supply voltage rises above said reference voltage;
- e. means for starting a first of said control cycles a predetermined time after said signal indicative of adequate power supply voltage is generated and
- f. means for selecting in a control cycle a time duration for said control cycles that occur subsequent to said control cycle in which said time duration is selected.

36. The low voltage detect function of claim 35 further comprising means for providing an indication when said digital system is reset that said resetting was in response to said signal indicative of low power supply voltage.

\* \* \* \* \*